(12) United States Patent
Peterson (10) Patent No.: US 10,681,026 B2
(45) Date of Patent: Jun. 9, 2020

(54) SECURE SHELL PUBLIC KEY AUDIT SYSTEM

(71) Applicant: QUEST SOFTWARE, Aliso Viejo, CA (US)

(72) Inventor: Matthew Todd Peterson, Lindon, UT (US)

(73) Assignee: QUEST SOFTWARE INC., Aliso Viejo, CA (US)

( * ) Notice: Subject to any disclaimer, the term of this patent is extended or adjusted under 35 U.S.C. 154(b) by 0 days.

(21) Appl. No.: 15/832,563

(22) Filed: Dec. 5, 2017

(65) Prior Publication Data

US 2018/0176199 A1    Jun. 21, 2018

Related U.S. Application Data

(63) Continuation of application No. 14/603,197, filed on Jan. 22, 2015, now Pat. No. 9,838,366.

(51) Int. Cl.
*H04L 9/32* (2006.01)
*H04L 29/06* (2006.01)

(52) U.S. Cl.
CPC .......... *H04L 63/061* (2013.01); *H04L 63/065* (2013.01); *H04L 63/0823* (2013.01); *H04L 63/101* (2013.01); *H04L 63/168* (2013.01)

(58) Field of Classification Search
CPC ..... H04L 63/06; H04L 63/061; H04L 63/065; H04L 63/0823; H04L 63/168; H04L 9/32
See application file for complete search history.

(56) References Cited

U.S. PATENT DOCUMENTS

| | | | | |
|---|---|---|---|---|
| 2013/0179681 A1* | 7/2013 | Benson | ............ | G06Q 20/38215 713/155 |
| 2013/0191893 A1* | 7/2013 | Sutton | ..................... | G06F 21/31 726/6 |
| 2014/0173287 A1* | 6/2014 | Mizunuma | ............ | H04L 9/0891 713/176 |
| 2014/0317409 A1* | 10/2014 | Bartok | .................... | H04L 63/06 713/171 |
| 2015/0334108 A1* | 11/2015 | Khalil | .................... | G06F 21/31 726/8 |

* cited by examiner

*Primary Examiner* — Trong H Nguyen
*Assistant Examiner* — Amie C. Lin
(74) *Attorney, Agent, or Firm* — Maschoff Brennan (57) ABSTRACT

A system for auditing authorized key files associated with secure shell (SSH) servers is disclosed. In an example, the system may include a purpose-built SSH audit server. The SSH audit server may be configured to receive an authorized key file and a list of users. The SSH audit sever may generate and provide unique registration codes for each of the users in the list. The SSH audit server may associate particular users with particular public keys as each of the users accesses the SSH audit server using a public key and inputs a registration code.

16 Claims, 4 Drawing Sheets

SECURE SHELL PUBLIC KEY AUDIT SYSTEM

This application is a continuation of U.S. patent application Ser. No. 14/603,197, filed on Jan. 22, 2015, the disclosure of which is incorporated by reference herein.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In particular, Secure Shell (SSH) is a cryptographic network protocol used by many entities, such as corporations and organizations, to provide secure data communication, remote access and control, and other secure network services to individuals associated with the entity but physically remote from the networked devices. In general, SSH systems employ public keys stored on the SSH server that may be used to authenticate information that may only be provided by a holder of the private key corresponding to the public key.

In some cases, as the public keys are registered with the SSH devices, the authorized key files become large and resource intensive. Additionally, as individuals leave or disassociate with the entity the public keys typically remain within the authorized key file as the public keys are not mapped to individual users. In some cases, this results in unclaimed public keys residing in the authorized key file or in individuals retaining unauthorized access to the entity's resources.

SUMMARY

In one implementation, an information handling system is described herein. The information handling system may include a communication interface for receiving an authorized key file associated with a secure shell (SSH) server and contact information associated with multiple users. The information handling system may generate a registration code corresponding to each of the users and provided the registration code to the corresponding user. The information handling system may then receive requests from a client device associated with each user to open a secure communication channel. The information handling system may authenticate the client device by identifying a public key from the authorized key file associated with the information provided by the client device. Once the secure communication channel is open, the information handling system may receive entry of a registration code and thereby map a user of the client device to a public key within the authorized key file.

In another example, an audit server may generate registration codes corresponding to individual users of a SSH server. The audit server may provide the registration codes to a location accessible to each user. The audit server may then receive requests from a client device associated with each user to open a secure communication channel. The audit server may authenticate the client device by identifying a public key associated with the information provided by the client device. Once the secure communication channel is open, the audit server may receive entry of a registration code and mark a user of the client device as the owner of the public key.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

This disclosure includes techniques and implementations to audit authorized key files associated with one or more SSH servers. In particular, this disclosure describes ways to implement a special purpose SSH audit server to generate a mapping of user names or email addresses to public keys contained in one or more authorized key files. For instance, as more and more users are added to the SSH system, the authorized key files continue to grow. However, when the users no longer require access to the SSH system the public keys typically remaining within the authorized key file, as the administrator has no way of identifying which public key is associated with which user. Therefore, the authorized key files may become large and resource intensive, and may provide an avenue for unauthorized access via one or more of the unclaimed public keys.

In some implementations, described herein, an administrator may generate a user list including all known authorized users associated with one or more SSH devices. In some cases, the user list may include contact information (e.g., a list of email addresses), user names, account names, etc. that may be used to identify authorized users of the SSH resources. The administrator may provide the user list to the purpose-built SSH audit server. In some cases, the administrator may also provide one or more authorized key files containing the public keys associated with the SSH servers being audited.

The SSH audit server may generate a unique identifier or registration code for each of the users within the user list. The registration codes are provided to each user, for example, in an email that contains the registration code and a link to access or login to the SSH audit server. In some cases, the email may include a time period for responding, such as when the SSH audit server is only active for one week. For instance, the time limit may allow the SSH audit server to audit multiple systems over the year, as well as to hinder any efforts to hack or otherwise falsify a registration or authorization of a public key on the SSH audit server.

As the user responds to the emails by logging into the SSH audit server, the SSH audit server is able to identify the public key of the user logging in. However, the SSH audit server may still be unable to determine the identity of the user. Thus, the SSH audit server may request that the user enter the unique identifier or registration code upon being granted access to the SSH audit server. When the user enters the unique identifier or registration code, the SSH audit server may map the public key to the user's email address via the unique identifier or registration code is associated with an individual user. If the user enters an invalid unique identifier or registration code, the SSH audit server may allow the user to re-enter the code a predetermined number of times, such as one to three additional times or some other number of times. If the user fails to enter a valid unique identifier or registration code within the predetermined number of times, the SSH audit server may thank the user and close the session. In this manner, the user may be unaware of whether or not the unique identifier or registration code was accepted, thereby preventing repeat registration attempts by invalid users, as well as preventing entry of randomly generated codes in an attempted brute force registration.

Once the period for registration is over, the SSH audit server may provide a list of registered users with a mapping to the corresponding public keys to the administrator. The SSH audit server may also provide a list of unclaimed or orphaned public keys that are located within the authorized key file being audited. In some cases, the SSH audit system may be configured to automatically remove or disable the orphaned public keys from the SSH servers being audited. In other cases, the administrator may decide whether or not to remove each of the orphaned public keys. In this manner, the orphaned public keys may be removed from the public key list, thereby reducing the overall size and the likelihood of an unauthorized user gaining access to the SSH servers.

Figure 1:
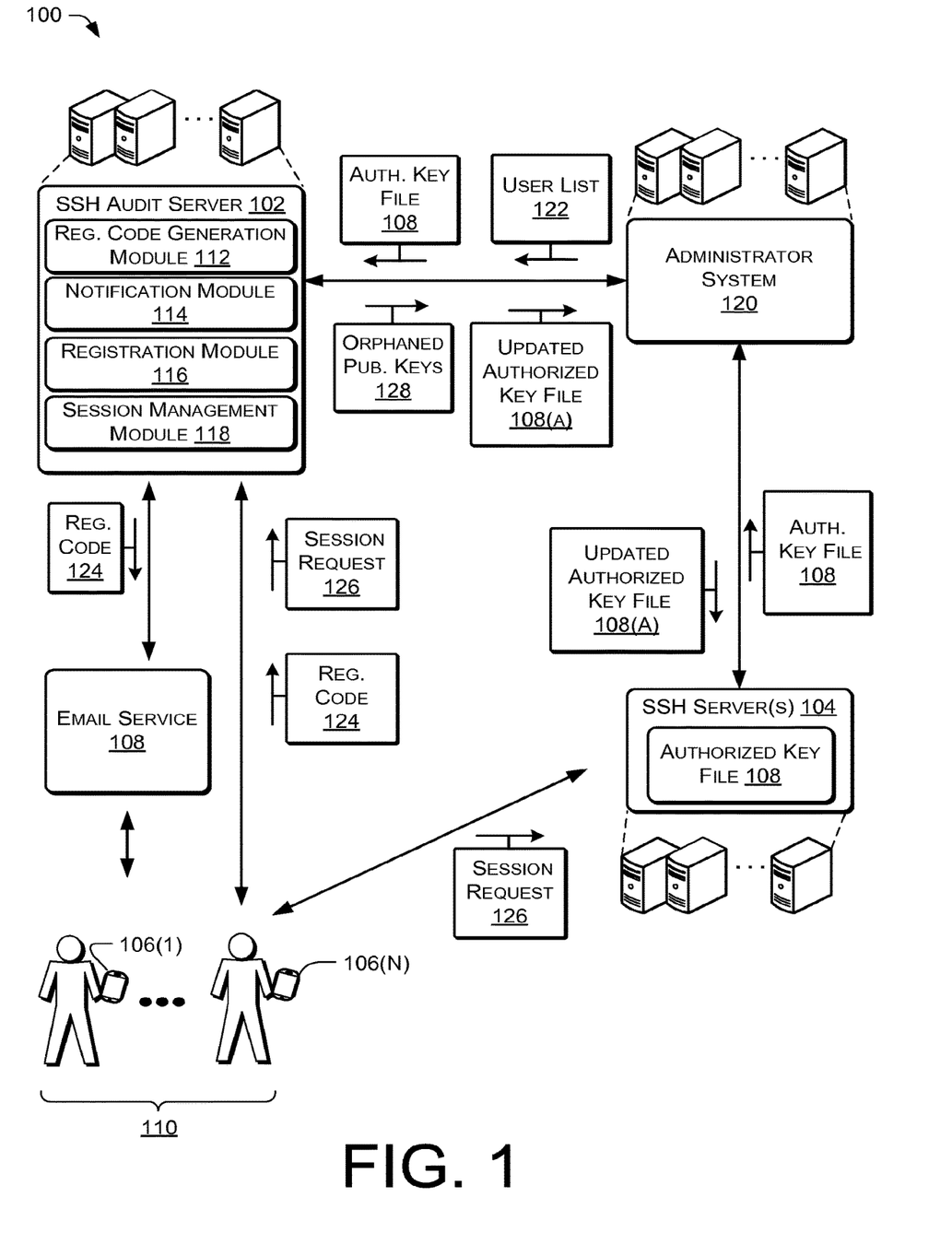
FIG. 1 illustrates an example system including a SSH audit server, a SSH host server, and multiple client devices.

FIG. 1 illustrates an example system 100 including a SSH audit server 102, a SSH host servers 104, and multiple client devices 106(1)-(N). In general, the SSH protocol is used by many entities, such as corporations and organizations, to provide secure data communication, as well as remote access and virtual control of networked and/or shared company resources. Each authorized user of the SSH host servers 104 first adds a public key corresponding to each user's private key to the SSH host server's 104 authorized key file 108. When a user 110 attempts to access the resources associated with the SSH host server 104, the user device 106 provides information that is generated based on the user's private key and may be authenticated by the host SSH server 104 based at least in part on the corresponding public key stored in the authorized key file 108.

However, as described above, over time some of the users 110 associated with the public keys stored in the authorized key files 108 leave the company or otherwise disassociates from the entity. Thus, the authorized key files 108 contain orphaned public keys (e.g., public keys that have no corresponding private key). In addition, to increasing the overall size of the authorized key file 108 and the total number of public keys maintained by the SSH host server 104, the orphaned public keys may still be utilized by the owner of the private keys to access the resources associated with the SSH host server 104. In some cases, this results in unauthorized access by harmless individuals, such as employees who have switched position within the company. However, in other cases, the orphaned public keys may be utilized by individuals for malicious or nefarious actions. For example, the malicious individual may access the comment section in the authorized key file 108 and update it to a person within the company who has access to the SSH host server 104, and then utilize the public key to gain unauthorized access.

Thus, FIG. 1 illustrates a system 100 including the SSH audit server 102 for identifying the orphaned public keys within the authorized key file 108. For example, the SSH audit server 102 may be a purpose-built or separate server system maintained for auditing the authorized key files 108 associated with one or more of the company's SSH host servers 104. The SSH audit server 102 may include various modules for performing the audit, registering public keys, and/or for mapping public keys to individual users 110.

For instance, in the illustrated example, the SSH audit server 102 includes a registration code generation module 112 for generating unique identifiers or registrations codes. The SSH audit server 102 may also include a notification module 114 for providing registration notifications to the users 110 and/or client devices 106(1)-(N). The SSH audit server 102 also includes a registration module 116 for registrations users 110 who access the SSH audit server 102 via one or more of the client devices 106(1)-(N), and a session management module 118 for opening sessions between the SSH audit server 102 and the client devices 106(1)-(N).

In one implementation, an administrator (not shown) may initiate an audit of the authorized key file 108 of the SSH host server 104 via the administrator system 120. The administrator system 120 retrieves a list of authorized users, as well as the authorized key file 108 or a list of the public keys stored on the SSH host server 104 from the SSH host server 104. In some cases, the list of authorized users may be retrieved from other company resources, such as one or more email servers, one or more company directories (e.g., each employee within certain departments or groups may have access to the SSH host server 104), an file stored on the administrator system 120 (e.g., an authorized user list associated with the SSH host server 104, among others). The administrator system 120 may provide both the authorized key file 108 and a user list 122 or list of employees, users, and other individuals who should have access to the SSH host server 104 to the SSH audit server 102. In some cases, user list 122 may include an email address associated with each of the individuals who should have access to the SSH host server 104. In other cases, the user list 122 may include a list of user names.

Once the SSH audit server 102 receives the authorized key file 108 and the user list 122, the registration code generation module 112 generates a unique identifier or registration code 124 for each individual in the user list 122. In some instances, the registration code generation module 112 maps to stores an association of the user name or user email address to the registration code 124, such that each user 110 may be identified based on entry of the registration code 124.

The notification module 114 of the SSH audit server 102 emails or otherwise notifies each of the individuals in the user list 122 either directly via the provided email address or remotely via an email server (not shown) that the user 110 should access the SSH audit server 102. For instance, the notification module 114 may email a link to access the SSH audit server 102. Since the SSH audit server 102 is using the authorized key file 108 from the SSH host sever 104, the user may simply access the SSH audit server 102 using their client device 106(1)-(N) and the corresponding private key. The email may also contain the registration code 124 and a message to keep the registration code private and have the registration code 124 available upon accessing the SSH audit server 102.

As each individual within the user list 122 provides a session request 126 to the SSH audit server 102, the session module 118 authenticates the session request 126 using a public key from the authorized key file 108 and the information provided by the client device 106(1)-(N) as part of the session request 126. The SSH audit server 102 may store the public key in a temporary memory or location. Once the login is complete, the registration module 116 may prompt the user to enter the user's registration code 124 received as part of the audit email containing the link to access the SSH audit server 102. The registration module 116 may then receive a registration code 124 and validate the registration code 124. If the registration code 124 is valid, the SSH audit server 102 may map or otherwise note that the public key used to initiate the session is associated with the user name corresponding to the registration code 124 entered during the current session. In this manner, each public key in use by a current or valid user within the authorized key file 108, may be mapped or associated with the particular individual holding the corresponding private key.

The SSH audit server 102 may continue to register public keys within the authorized key file 108 over a period of time. When the period of time ends, the SSH audit server 102 may contain a mapping of public keys to user names and/or email address for each public key still in use. The SSH audit server 102 may also contain an updated authorized public key file 108(A) containing the registered public keys and a list of orphaned public keys 128 or unregistered public keys within the original authorized key file 108. The SSH audit server 102 may provide the orphaned public keys 128 and/or the updated authorized public key file 108(A) to the administrator system 120.

The administrator system 120 may replace the authorized key file 108 stored on the SSH host server 104 with the updated authorized public key file 108(A), thereby removing the orphaned public keys 128 from the SSH host server 104. In other cases, the administrator system 120 may utilize may note the orphaned public keys 128 in the comment section of the authorized key file 108 on the SSH host server 104. In still other cases, the administrator system 120 may undertake further investigation of the orphaned public keys 128 to determine the identity of the owner of the corresponding private key.

In some situations, the registration code 124 input by the user when prompted by the registration module 116 may be invalid. In these situations, the SSH audit server 102 may thank the user and mark the public key for further investigation, as the registration code 124 entered was invalid. In other examples, the SSH audit server 102 may allow the user a predetermined number of additional attempts (e.g., 2 or 3 attempts) to enter a valid registration code 124. Again, if the user fails to enter a valid registration code 124 the SSH audit server 102 may mark the public key for further investigation, as the registration code 124 was invalid. In some cases, the SSH audit server 102 may delete the public key rather than marking the public key, as failure to enter a valid registries code 124 may be indicative of an attempt to register the public key by an unauthorized user.

In other situations, the SSH audit server 102 may have users within the user list 122 that did not register a public key. In these situations, the SSH audit server 102 may attempt to re-notify the user of the need to register. In other examples, the SSH audit server 102 may notify the administrator system 120 of the failure of one or more users to register a public key, for instance, to allow the administrator to conduct further investigation or contact the user directly.

It should be understood that while in the illustrated example, the authorized key file 108 is received at the SSH audit server 102 via the administrator system 120 and that the updated authorized key file 108(A) is provided to the administrator system 120, that in some implementations the SSH audit server 102 may include one or more modules for retrieving and providing the authorized key files 108 and 108(A) to and from the SSH host server 104 directly. Additionally, while the public keys are described herein as stored within an authorized key file, it should be understood that the authorized key file may be one or more files, one or more databases, one or more data stores, etc.

Figure 2:
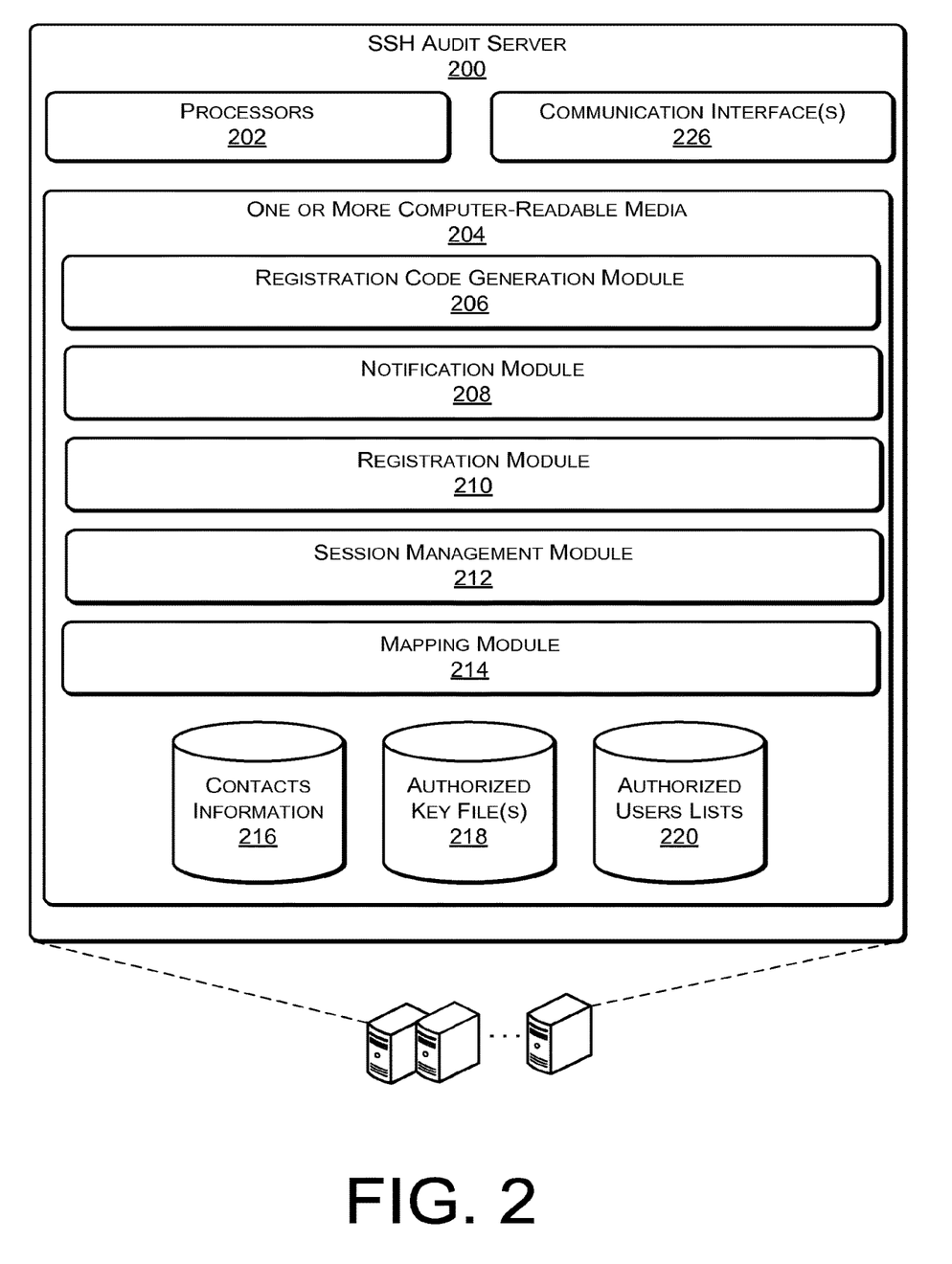
FIG. 2 illustrates an example architecture of one or more resources associated with the hosting the SSH audit server.

FIG. 2 illustrates an example architecture of one or more resources associated with the hosting the SSH audit server 200. The SSH audit server 200 collectively comprise processing resources, as represented by processors 202, and computer-readable storage media 204. The computer-readable storage media 204 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

Several modules such as instruction, data stores, and so forth may be stored within the computer-readable media 204 and configured to execute on the processors 202. Various modules may be stored on computer-readable storage media 204, such as registration code generation module 206, notification module 208, registration module 210, session mapping module 212, and mapping module 214. In the current example, the registration code generation module 206 may be configured to generate unique identifiers or registration codes for each individual included in the audit of the authorized key file(s) or the SSH host server(s).

The notification module 208 may be configured to provide notification to each individual included in the audit. For example, the notification may be a message, email, or other type of announcement for each individual and may include the individual's registration code and a way to connect to the SSH audit server 200, for instance, the notification may include a link or login information.

The registration module 210 may be configured to accept and validate user entered resections codes and the session management module 212 may be configured to open and maintain a session between a client device and the SSH audit server 200. In some implementations, the mapping module 214 may be configured to map public keys corresponding to clients that access the SSH audit server 200, the registration codes entered by the users, and the user name or email address.

The computer-readable media 204 may also be configured to store contact information 216, authorized key file(s) 218, and registered users lists 220. In some cases, the contact information 216 may include email address for employees, vendors, or other authorized users of the SSH host servers. The authorized key file(s) 218 may include one or more of the authorized key files being audited, as well as updated authorized key files generated by the SSH audit server 200. The authorized user lists 220 may include a list of user's received from an administrator that are known to be authorized to access the SSH host server being audited.

In one example, the administrator may initiate an audit by providing the SSH audit server 200 with one or more the authorized key files and a list of authorized users 220. In some cases, the list of authorized users may be retrieved from other company resources, such as one or more email servers, one or more company directories, or a file stored on an administrator system, among others. In some cases, registered user list may include an email address associated with each of the individuals whom should have access to the audited system.

Once the SSH audit server 200 receives the authorized key files and the user list, the registration code generation module 206 generates a unique identifier or registration code for each individual in the authorized user list 220. In some instances, the registration code generation module 206 maps to stores an association of the user name or user email address to the registration code, such that each user may be identified based on entry of the registration code. In some cases, the registration code may include 5 or 6 alpha/numeric characters.

The notification module 208 may email or otherwise notify each of the individuals in the authorized user list 220 either directly via the provided email address or remotely via an email server (not shown) that the user should access the SSH audit server 200. For instance, the notification module 208 may email a link to access the SSH audit server 200. Since the SSH audit server 200 is using the authorized key file 218 from the SSH host sever 200, the user may simply access the SSH audit server 200. The email may also contain the registration code and a message to keep the registration code private and have the registration code available upon accessing the SSH audit server 200.

As each individual within the authorized user list 220 provides a session request to the SSH audit server 200, the session module 212 authenticates the session request using a public key from the authorized key file 218 and the information provided by the user as part of the session request. The SSH audit server 200 may store the public key in a temporary memory or location. Once the login is complete, the registration module 210 may prompt the user to enter the user's registration code received as part of the audit email containing the link to access the SSH audit server 200. The registration module 210 may receive and validate the registration code. If the registration code is valid, the mapping module 214 may map or otherwise note that the public key used to initiate the session is associated with the user name corresponding to the registration code entered during the current session. In this manner, each public key in use by a current or valid user within the authorized key file, may be mapped or otherwise associated with the particular individual holding the corresponding private key.

The SSH audit server 200 may continue to register public keys within the authorized key file over a period of time. When the period of time ends, the SSH audit server 200 may contain a mapping or list of public keys to user names and/or email address for each public key still in use. The SSH audit server 200 may also contain an updated authorized public key file containing the registered public keys and a list of orphaned public keys or unregistered public keys within the original authorized key file. The SSH audit server 200 may provide the orphaned public keys and/or the updated authorized public key file to the administrator.

Figure 3:
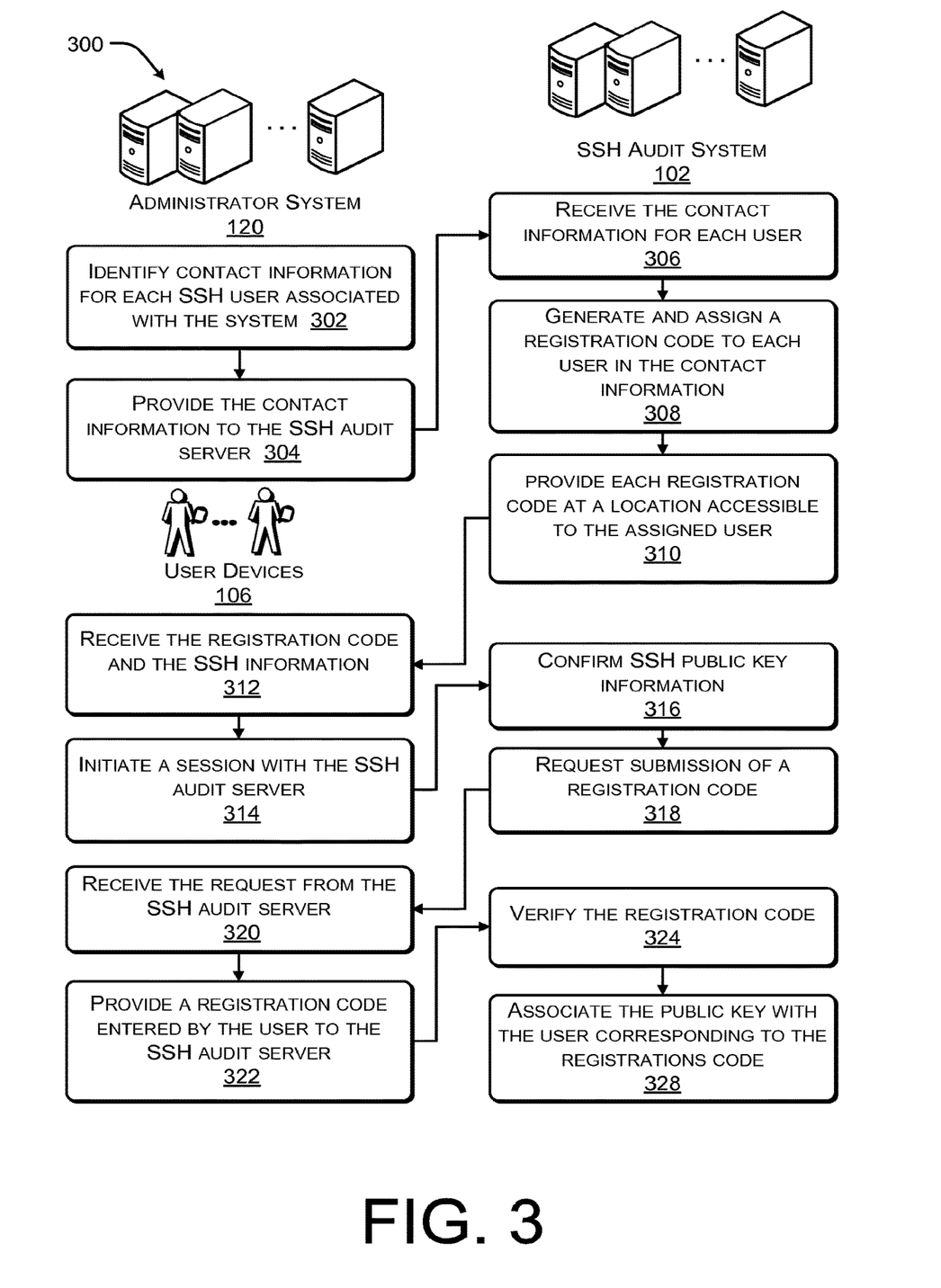
FIG. 3 is an example flow diagram showing an illustrative process to facilitate audits of SSH servers.
Figure 4:
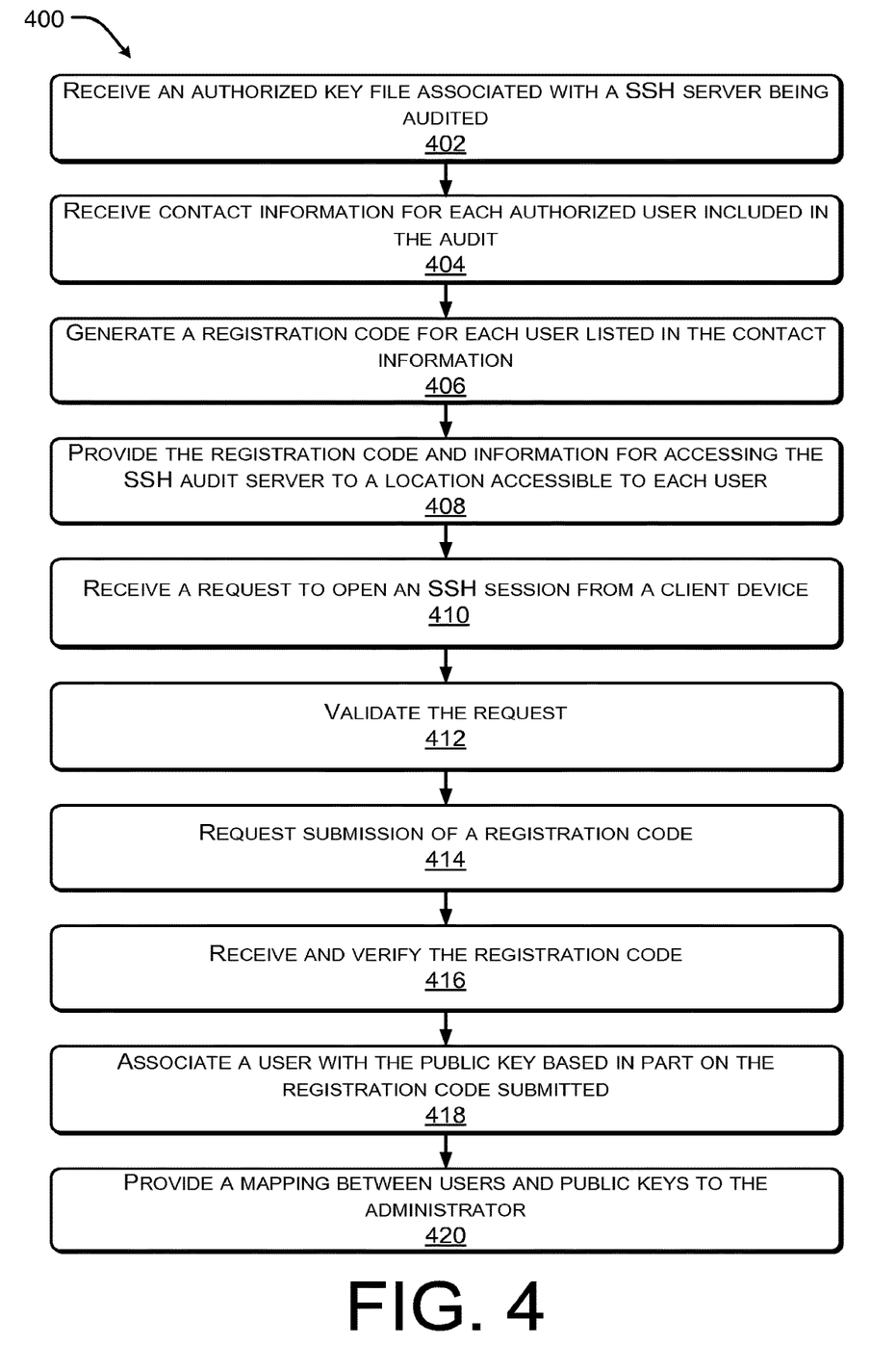
FIG. 4 is another example flow diagram showing an illustrative process to facilitate audits of SSH servers.

FIGS. 3 and 4 are flow diagrams illustrating example processes for implementing the SSH audit systems described herein. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 3 is an example flow diagram showing an illustrative process 300 to facilitate audits of SSH servers, such as SSH host servers 104 of FIG. 1. The authorized key files stored on the SSH servers may overtime become large and contain one or more orphaned public keys. Therefore, the process 300 illustrates an example in which the public key files within an authorized key file may be registered to ensure each of the public keys are still in use.

At 302, an administrator or the administrator system 120 of FIG. 1 identifies contact information for each SSH user associated with the SSH server system being audited. For example, the administrator may utilized one or more company resources other than the SSH server system to identify a list of authorized users and a list of email address associated with each user. In this manner, the list of authorized user is compiled outside of the SSH server being audited.

At 304, the administrator provides the contact information to an SSH audit server, such as SSH audit server 102 of FIG. 1. In some cases, the administrator may also provide the authorized public key file of the SSH server being audited. In other cases, the authorized public key file may be obtained directly by the SSH audit server 102 or the SSH public server 102 may generate a new authorized key file that may be later compared with the authorized key file of the SSH server being audited.

At 306, the SSH audit server 102 receives the contact information for each user from the administrator system 120. For example, the contact information may contain a list of employees, contractors, and other individuals authorized to access the SSH server being audited together with an email address for each person or group. In some cases, the contact information may include individuals likely to have access to the SSH server being audited if the authorized user list is unknown.

At 308, the SSH audit server 102 generates and assigns a registration code to each user designated in the contact information. The registration code may be an unique identifier that is associated or otherwise mapped to a particular user. For example, the registration code may be utilized to identify the user or the contact that possess the code or input the registration code into the SSH audit server 102.

At 310, the SSH audit server 102 provides each registration code to a location accessible to the assigned user. In some cases, the SSH audit sever 102 may also provide the SSH access information to each user with the registration code to assist the users in establishing a communication with the SSH audit server. For example, the SSH audit server 102 may email the registration code and the SSH information to each user listed in the contact information received from the administrator. In other examples, the location may be an instance message to an account owned by each user or locations associated with other interoffice communication systems, such as voicemails.

At 312, each user receives the registration code and the SSH information. For example, the user may access their email address via one or more client device, such as client devices 106 of FIG. 1, and receive the registration code and a link to connect to or open a session with the SSH audit server 102.

At 314, the user initiates a session with the SS audit server 102. For example, the user may select the link in the email displayed on the client device 106 and cause the client device 106 to request or initiate an SSH session with the SSH audit server 102. As part of the initiation, the client device 106 may provide information generated based at least in part on the user's private key corresponding to the public key in the authorized key file being audited.

At 316, the SSH audit server 102 confirms the SSH public key information by verifying the information provided by the client device 106 generated using the corresponding private key. Thus, if the SSH audit server 102 is able to authenticate the information provided by the client device 106, the SSH audit server 102 is able to identify or associate a public key with the current session.

In some implementations, at 314 and 316, the user devices 106 may initiate the session or provide a session request and the SSH audit system 102 may confirm the SSH public key information using standard SSH protocols. For example, the user devices 106 may initiate a session via a secure shell interface. In other examples, the user devices 106 may initiate the session by providing a message including a channel number, channel type, sender channel, window size, and packet size. The SSH audit server 102 may then respond to the message by providing a return message indicating a recipient channel, sender channel, window size, packet size, and, in some cases, channel type specific data.

At 318, the SSH audit server 102 may request submission of a registration code. For example, as the session is open and a public key has been identified, if the user enters a valid registration code, the SSH audit server 102 may map or correspond the public key associated with the current session and the user associated with the registration code that was entered.

At 320, the user receives the request to enter the registration code. For example, the request may include an indication to enter the registration code provided as part of the message containing the link to access the SSH audit server 102. In some instances, the request may remind the user that the registration codes are unique to each person and may only be utilized once and to confirm that the registration code is correctly entered before submission.

At 322, the client device 106 provides a registration code entered by the user to the SSH audit server 102. In some cases, the registration code may be provided automatically by the client device in response to the user selecting a link within the email. In other cases, the user may hand enter the registration code by for example, typing or using other haptic feedback devices. In some instances, the user may provide the registration code via a secure shell offered by the SSH audit server 102. In some cases, the secure shell may operate under standard SSH protocols.

At 324, the SSH audit server receives the registration code from the client device 106 and verifies that the registration code is valid. If the registration code is valid the process 300 proceeds to 326, otherwise the process 300 may return to 318 and the SSH audit server 102 may again request submission of the registration code. In other examples, the SSH audit server 102 may be configured to allow only a single registration code submission and if the registration code is invalid, the SSH audit server 102 may notify the administrator that the user of the public key failed to produce a valid registration code.

At 326, the SSH audit server associates the public key of the current session with the user corresponding to the registrations code. For example, if registrations code is valid then the registration code was previously assigned to a particular user, user name, or account. When the registrations code is submitted via a session opened with an identified public key, the public key may then be associated or mapped to that particular user, user name, or account. In this manner, the process 300 is able to identify public keys that are still in use as well as one or more orphaned public keys which may no longer be in use.

FIG. 4 is another example flow diagram showing an illustrative process 400 to facilitate audits of SSH servers. As described above, the authorized key files stored on the SSH servers may overtime become large and contain one or more orphaned public keys. Therefore, the process 400 illustrates an example in which the public key files within an authorized key file may be associated with registered users to ensure that the public keys are in use.

At 402, a SSH audit server, such as SSH audit server 102 of FIG. 1, may receive an authorized key file associated with the SSH server being audited. For example, an administrator or an administrator system may provide a copy of one or more authorized key files stored on the SSH servers or resources being audited. In other cases, the SSH audit server 102 may be configured to access, request, or retrieve the authorized key files from the SSH server.

At 404, the SSH audit server 102 may receive contact information for each authorized user included in the audit from an administrator or an administrator system. For example, the contact information may contain a list of employees, contractors, and other individuals authorized to access the SSH server being audited together with an email address for each person or group. In some cases, the contact information may include individuals likely to have access to the SSH server being audited if the actual authorized user list is unknown.

At 406, the SSH audit server 102 may generate a registration code for each user listed in the contact information. As described above, the registration code may be an unique identifier that is associated or otherwise mapped to a particular user. For example, the registration code may be utilized to identify the user or the contact that possess the code or input the registration code into the SSH audit server 102. In one particular example, the registration code may be a system password previously associated with the user, for instance, to further discourage the user from sharing the registration code with others.

At 408, the SSH audit server 102 may provide the registration code and information for accessing the SSH audit server 102 to a location accessible to each user. For example, the SSH audit server 102 may email the registration code and the SSH information to each user listed in the contact information. In other examples, the location may be an instance message to an account owned by each user or locations associated with other interoffice communication systems, such as voicemails.

At 410, the SSH audit server 102 may receive a request to open an SSH session from a client device associated with a particular user. For example, the user may select the link in the email displayed on the client device 106 and cause the client device to request or initiate an SSH session with the SSH audit server 102. As part of the initiation, the client device 106 may provide information generated based at least in part on the user's private key corresponding to the public key in the authorized key file received by the SSH audit server 102 at 402.

At 412, the SSH audit server 102 may validate the request to open a session. For example, the SSH audit server 102 may utilize a public key corresponding to the private key of the user to validate the information provided and authenticate the user. Once the SSH audit server 102 validates and authenticates the request, the SSH audit server 102 has a public key that may be associated with the current SSH session.

At 414, the SSH audit server 102 may request submission of a registration code. In some cases, the registration code may be provided automatically by the client device in response to the user selecting a link within the email. In other cases, the user may hand enter the registration code by for example, typing or using other haptic feedback devices.

At 416, the SSH audit server may receive the registration code and verify that the registration code is valid. If the registration code is valid the process 400 proceeds to 418, otherwise the SSH audit server 102 may again request submission of the registration code. In other examples, the SSH audit server 102 may be configured to allow only a single registration code submission and if the registration code is invalid, the SSH audit server 102 may notify the administrator that the user of the public key failed to produce a valid registration code.

At 418, the SSH audit server 102 may associate a user with the public key based in part on the registration code submitted. For example, the registration code was assigned to a particular user during the registration code generation process and the public key is known as the public key was utilized to open the current SSH session. Thus, the public key associated with the current session may be mapped or assigned to that particular user associated with the registration code submitted. In this manner, the process 400 is able to identify public keys that are still in use (e.g., public keys that are associated with a registered user) as well as one or more orphaned public keys which may no longer be in use (e.g., public keys that are not associated with registered user).

At 420, the SSH audit server 102 may provide a mapping between users and public keys to the administrator. For example, as users register over a period of time associated with the audit, the SSH audit server 102 is able to map or associate public keys with individual users. Once the audit is complete, the SSH audit server 102 may contain a mapping or list of public keys that belong to the individual users. The SSH audit server 102 may also contain a list of orphaned public keys and a list of users that did not register (e.g., the assigned registration code was not entered during the time period associated with the audit). In some cases, the SSH audit server 102 may provide the mapping, the list of orphaned public keys, and the list of users that did not register to an administrator whom may take further action based on the information provided.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system, comprising:
   one or more communication interfaces to communicate with one or more client devices;
   one or more hardware processors; and
   computer-readable storage media storing computer-executable instructions, which when executed by the one or more hardware processors, cause the one or more hardware processors to perform operations comprising:
   receive a request to open a secure communication channel from a client device associated with an individual, the request including information generated based at least in part on a private key;
   authenticate the request based at least in part on a public key associated with the individual;
   receive a registration code from the client device corresponding to the individual;
   attempt to validate the registration code by determining whether the registration code is valid for the individual;
   mark the public key for further investigation responsive to determining that the registration code is invalid for the individual;
   based on the further investigation, determining an identity of an owner of the private key;
   based on the identity of the owner of the private key, permit a second registration code to be received from the client device; and
   associate the individual with the public key based on the second registration code.

2. The system of claim 1, the request includes a request to open a secure communication channel from the client device the operations further comprising:

open the secure communication channel;
request input of any registration code;
in response to requesting input of the any registration code, receiving the registration code from the client device; and
associate the individual with the public key.

3. The system of claim 2, the operations further comprising identify the registration code as valid by matching the registration code with a predetermined registration code.

4. The system of claim 2, the operations further comprising identify the registration code as invalid by failing to match the registration code with a predetermined registration code; and
remove the public key from an authorized key file.

5. A method, comprising:
generating, at an audit server, a unique registration code;
associating the unique registration code with a user;
sending the unique registration code to a client device of the user;
receiving a public key and a request to open a communication channel from the client device;
establishing the communication channel based at least in part on the public key;
receiving an input of a registration code from the client device;
attempting to validate the registration code by determining whether the registration code corresponds to the unique registration code;
marking the public key for further investigation responsive to determining that the registration code does not correspond to the unique registration code;
based on the further investigation of the public key, determining an identity of an owner of a private key that is associated with the client device;
based on the identity of the owner of the private key, permitting a second registration code to be received from the client device; and
associating the user with the public key based on the second registration code.

6. The method of claim 5, further comprising:
generating a second unique registration code;
associating the second unique registration code with a second user;
sending the second unique registration code to a second client device of the second user;
receiving a second request to open a second communication channel from the second client device;
establishing the second communication channel based at least in part on a second public key;
receiving a second input of the second unique registration code from the second client device; and
associating the second user with the second public key based at least in part on receiving the second unique registration code via the second communication channel.

7. The method of claim 5, further comprising sending a login credential to the client device to establish the communication channel with the audit server.

8. The method of claim 5, wherein the communication channel includes a secure shell.

9. The method of claim 5, further comprising:
receiving, prior to generating the unique registration code, an authorized key file associated with a server being audited, the authorized key file including the public key; and
receiving, prior to generating the unique registration code, contact information associated with a plurality of individuals authorized to access the server, the plurality of individuals including the user.

10. One or more non-transitory computer-readable storage media configured to store computer-executable instructions, which when executed by one or more processors, cause a system to perform operations comprising:
generate a plurality of registration codes, a registration code of the plurality of registration codes associated with a user;
send the registration code to a client device of the user;
receive an input of the registration code over a communication channel established based in part on a public key;
attempt to validate the registration code by determining whether the registration code is valid for the user;
mark the public key for further investigation responsive to determining that the registration code is invalid for the user;
based on the further investigation of the public key, determine an identity of an owner of a private key that is associated with the client device;
based on the identity of the owner of the private key, permit a second registration code to be received from the client device; and
associate the user with the public key based on the second registration code.

11. The one or more non-transitory computer-readable storage media of claim 10, wherein execution of the instructions further cause the system to receive, prior to generating the registration code, contact information associated with a plurality of individuals authorized to access a server being audited, the plurality of individuals including the user.

12. The one or more non-transitory computer-readable storage media of claim 10, wherein execution of the instructions further cause the system to receive, prior to generating the plurality of registration codes, an authorized key file associated with a server being audited, the authorized key file including the public key.

13. The one or more non-transitory computer-readable storage media of claim 10, wherein execution of the instructions further cause the system to:
receive a request to open the communication channel from the client device; and
establish the communication channel based at least in part on the public key.

14. The one or more non-transitory computer-readable storage media of claim 10, wherein the one or more non-transitory computer-readable storage media is a resource associated with a secure shell audit server.

15. The one or more non-transitory computer-readable storage media as recited in claim 10, wherein execution of the instructions further cause the system to generate a list of registered public keys, the list of registered public keys including the public key and an indication of the user as an owner of the public key.

16. The one or more non-transitory computer-readable storage media as recited in claim 15, wherein execution of the instructions further cause the system to provide the list of registered public keys to an administrator system after a predetermined period of time has elapsed.

* * * * *